United States Patent
Lee et al.

(10) Patent No.: US 10,592,126 B2
(45) Date of Patent: Mar. 17, 2020

(54) MEMORY MANAGEMENT METHOD, MEMORY STORAGE DEVICE AND MEMORY CONTROL CIRCUIT UNIT

(71) Applicant: Hefei Core Storage Electronic Limited, Anhui Province (CN)

(72) Inventors: Hao-Zhi Lee, Miaoli (TW); Hui Xie, Anhui Province (CN); Meng Xiao, Anhui Province (CN); Ren Jun Tang, Anhui Province (CN); Dong Sheng Guan, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 262 days.

(21) Appl. No.: 15/869,084

(22) Filed: Jan. 12, 2018

(65) Prior Publication Data

US 2019/0138225 A1     May 9, 2019

(30) Foreign Application Priority Data

Nov. 7, 2017   (CN) .......................... 2017 1 1081990

(51) Int. Cl.
*G06F 3/06* (2006.01)
*G06F 1/3225* (2019.01)

(52) U.S. Cl.
CPC .......... *G06F 3/0616* (2013.01); *G06F 1/3225* (2013.01); *G06F 3/0625* (2013.01); *G06F 3/0634* (2013.01); *G06F 3/0659* (2013.01); *G06F 3/0679* (2013.01)

(58) Field of Classification Search
CPC .... G06F 3/0616; G06F 1/3225; G06F 3/0625; G06F 3/0634; G06F 3/0659; G06F 3/0679
See application file for complete search history.

(56) References Cited

U.S. PATENT DOCUMENTS

| | | | |
|---|---|---|---|
| 6,553,501 B1* | 4/2003 | Yokoe | G06F 1/3203 713/320 |
| 2003/0210658 A1 | 11/2003 | Hernandez et al. | |
| 2005/0007918 A1* | 1/2005 | Tokudome | G11B 19/26 369/47.36 |

FOREIGN PATENT DOCUMENTS

| | | |
|---|---|---|
| TW | 201338537 | 9/2013 |
| TW | I595412 | 8/2017 |

OTHER PUBLICATIONS

"Office Action of Taiwan Counterpart Application", dated Jun. 28, 2018, p. 1-p. 6.

* cited by examiner

*Primary Examiner* — Eric Cardwell
(74) *Attorney, Agent, or Firm* — JCIPRNET (57) ABSTRACT

A memory management method is provided according to an exemplary embodiment of the disclosure. The method includes: receiving a plurality of commands from a host system; counting a newest idle time corresponding to the commands and a past average command-receiving-time-interval corresponding to the commands; and dynamically changing a work mode of a memory storage device from a first work mode to a second work mode if the newest idle time is larger than a first threshold value and the past average command-receiving-time-interval is larger than a second threshold value. Therefore, a power consumption of the memory storage device can be reduced and a work mode of the memory storage device may not be changed too frequently.

21 Claims, 6 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of China application serial no. 201711081990.6, filed on Nov. 7, 2017. The entirety of the above-mentioned patent application is hereby incorporated by reference herein and made a part of this specification.

BACKGROUND

1. Technology Field

The disclosure is directed to a memory management method, a memory storage device and a memory control circuit unit.

2. Description of Related Art

Along with the rapid growth of digital cameras, cell phones, and MP3 players in recently years, consumers' demand on storage media has been increased drastically. A rewritable non-volatile memory module (e.g., a flash memory), as having features such as data non-volatility, low power consumption, small volume, and non-mechanical structure, high reading and writing speed, has become adaptable to be installed in various portable multi-media devices listed above.

Generally speaking, a memory storage device may usually use a fixed threshold value by default for determining whether to enter an idle mode or a power-saving mode. When the memory storage device does not receive any command from a host system for a long time, which results in an idle time exceeding the threshold value, the memory storage device enters the idle mode or the power-saving mode for saving power consumption. In addition, when entering the idle mode, the memory storage device usually utilizes this idle time to write data from a buffer memory into the rewritable non-volatile memory module. However, if the memory storage device enters the idle mode or the power-saving mode too frequently, it may cause significant increase in the frequency of reading and/or writing the rewritable non-volatile memory module, which may lead to reduced lifespan of the rewritable non-volatile memory module.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The exemplary embodiments of the disclosure provide a memory management method, a memory storage device and a memory control circuit unit capable of determining whether to switch a work mode according to two parameters with different meanings to extend a lifespan of a rewritable non-volatile memory module.

An exemplary embodiment of the disclosure provides a memory management method for a memory storage device including a counting circuit, a work mode controller and a rewritable non-volatile memory module. The memory management method includes: receiving a plurality of commands from a host system; counting a newest idle time corresponding to the commands and a past average command-receiving-time-interval corresponding to the commands by the counting circuit; dynamically changing a work mode of the memory storage device from a first work mode to a second work mode by the work mode controller if the newest idle time is greater than a first threshold value and the past average command-receiving-time-interval is greater than a second threshold value; and maintaining the work mode of the memory storage device in the first work mode if the newest idle time is not greater than the first threshold value or the past average command-receiving-time-interval is not greater than the second threshold value, wherein a power consumption of the memory storage device operated in the first work mode is higher than a power consumption of the memory storage device operated in the second work mode.

Another exemplary embodiment of the disclosure provides a memory storage device including a connection interface unit, a rewritable non-volatile memory module and a memory control circuit unit. The connection interface unit is configured to be coupled to a host system. The memory control circuit unit is coupled to the connection interface unit and the rewritable non-volatile memory module. The memory control circuit unit is configured to receive a plurality of commands from the host system. The memory control circuit unit is further configured to count a newest idle time corresponding to the commands and a past average command-receiving-time-interval corresponding to the commands. The memory control circuit unit is further configured to dynamically switch a work mode of the memory storage device from a first work mode to a second work mode if the newest idle time is greater than a first threshold value and the past average command-receiving-time-interval is greater than a second threshold value. The memory control circuit unit is further configured to maintain the work mode of the memory storage device in the first work mode if the newest idle time is not greater than the first threshold value or the past average command-receiving-time-interval is not greater than the second threshold value. A power consumption of the memory storage device operated in the first work mode is higher than a power consumption of the memory storage device operated in the second work mode.

Another exemplary embodiment of the disclosure provides a memory control circuit unit for controlling a memory storage device including a rewritable non-volatile memory module. The memory control circuit unit includes a host interface, a memory interface, a counting circuit, a work mode controller and a memory management circuit. The host interface is configured to be coupled to a host system. The memory interface is configured to be coupled to the rewritable non-volatile memory module. The memory management circuit is coupled to the host interface, the memory interface, the counting circuit and the work mode controller. The memory management circuit is configured to receive a plurality of commands from the host system. The counting circuit is configured to count a newest idle time corresponding to the commands and a past average command-receiving-time-interval corresponding to the commands. The work mode controller is configured to dynamically switch a work mode of the memory storage device from a first work mode to a second work mode if the newest idle time is greater than a first threshold value and the past average command-receiving-time-interval is greater than a second threshold value. The work mode controller is further configured to maintain the work mode of the memory storage device in the first work mode if the newest idle time is not greater than the first threshold value or the past average command-receiving-time-interval is not greater than the second threshold value. A power consumption of the memory storage device operated in the first work mode is higher than a power consumption of the memory storage device operated in the second work mode.

Based on the above, the disclosure can, besides determining whether to switch the work mode of the memory storage device by employing whether the newest idle time is greater than the first threshold value as a condition, determine whether to switch the work mode further according to whether the past average command-receiving-time-interval is greater than the second threshold value, thereby achieving double confirmation. In this way, a timing for switching the work mode can be determined more accurately, a frequency of switching the work mode can be reduced, and the lifespan of the rewritable non-volatile memory module can be extended.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (which is also referred to as a memory storage system) includes a rewritable non-volatile memory module and a controller (which is also referred to as a control circuit). The memory storage device is usually used together with a host system, such that the host system can write data into the memory storage device or read data from the memory storage device.

Figure 1:
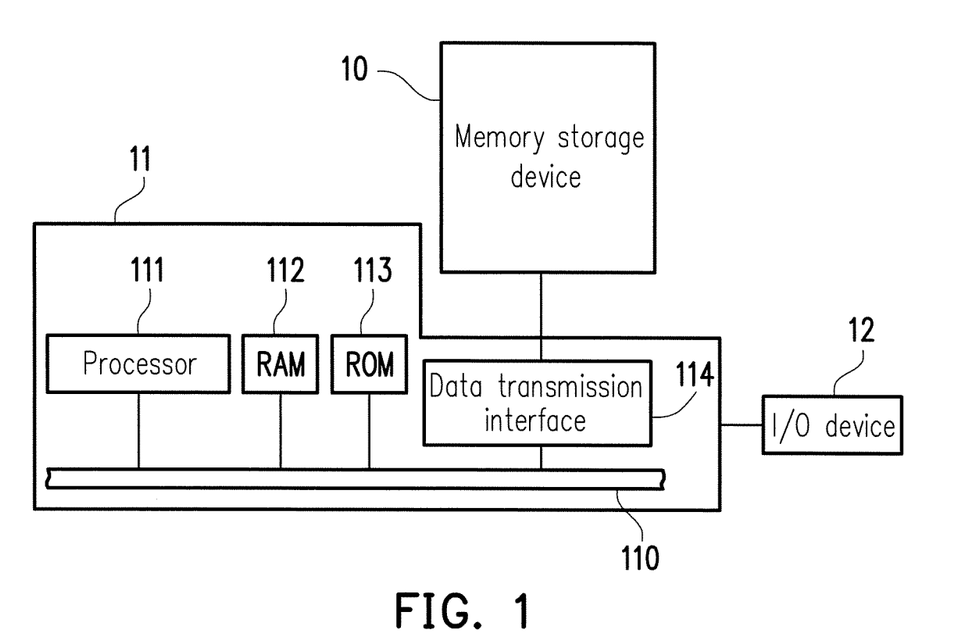
FIG. 1 is a schematic diagram illustrating a host system, a memory storage device and an input/output (I/O) device according to an exemplary embodiment of the disclosure.
Figure 2:
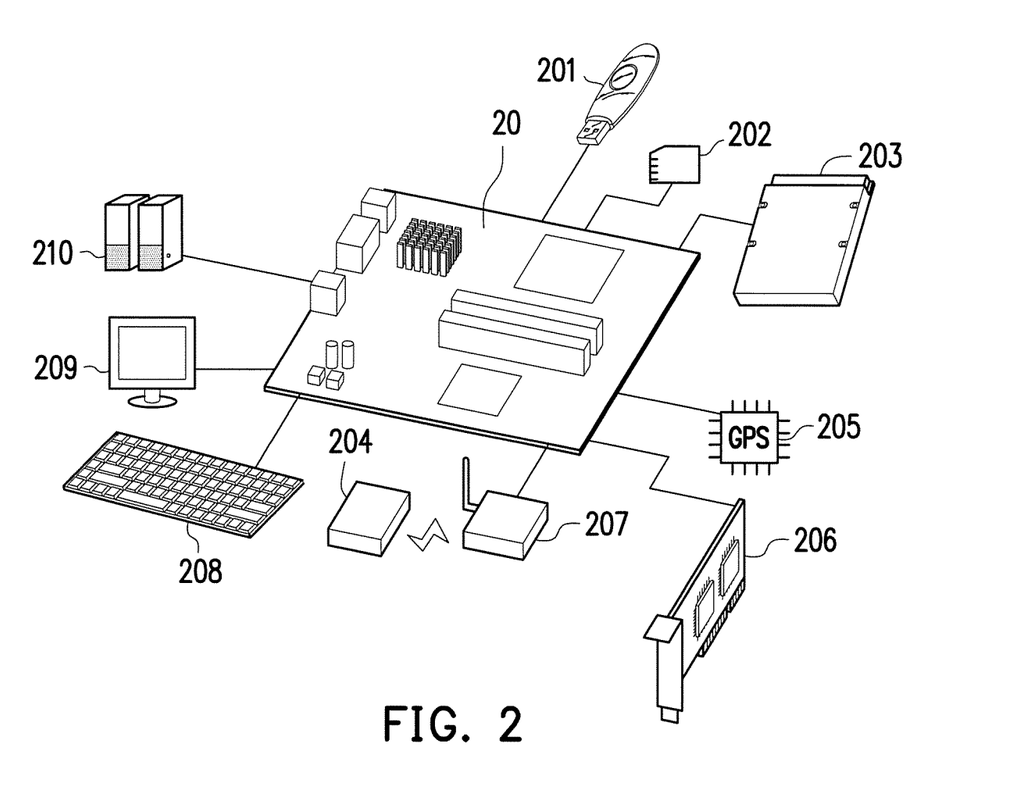
FIG. 2 is a schematic diagram illustrating a host system, a memory storage device and an I/O device according to another exemplary embodiment of the disclosure.

FIG. 1 is a schematic diagram illustrating a host system, a memory storage device and an input/output (I/O) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a random access memory (RAM) 112, a read only memory (ROM) 113 and a data transmission interface 114. The processor 111, the RAM 112, the ROM 113 and the data transmission interface 114 are all coupled to the system bus 110.

In the present exemplary embodiment, the host system 11 is coupled to the memory storage device 10 through the data transmission interface 114. For example, the host system 11 may store data into the memory storage device 10 or read data from the memory storage device 10 through the data transmission interface 114. In addition, the host system 11 is coupled to the I/O device 12 through the system bus 110. For example, the host system 11 may transmit output signals to the I/O device 12 or receive input signals from the I/O device 12 through the system bus 110.

In the present exemplary embodiment, the processor 111, the RAM 112, the ROM 113 and the data transmission interface 114 may be disposed on a mainboard 20 of the host system 11. The number of the data transmission interface 114 may be one or plural. The mainboard 20 may be coupled to the memory storage device 10 in a wired or a wireless manner through the data transmission interface 114. The memory storage device 10 may be, for example, a flash drive 201, a memory card 202, a solid state drive (SSD) 203 or a wireless memory storage device 204. The wireless memory storage device 204 may be a memory storage device based on various wireless communication technologies, for example, a near field communication (NFC) memory storage device, a wireless fidelity (WiFi) memory storage device, a Bluetooth memory storage device or a Bluetooth low energy (BLE) memory storage device (e.g., iBeacon). Further, the mainboard 20 may also be coupled to various I/O devices including a global positioning system (GPS) module 205, a network interface card 206, a wireless transmission device 207, a keyboard 208, a monitor 209 and a speaker 210 through the system bus 110. For example, in an exemplary embodiment, the mainboard 20 may access the wireless memory storage device 204 through the wireless transmission device 207.

Figure 3:
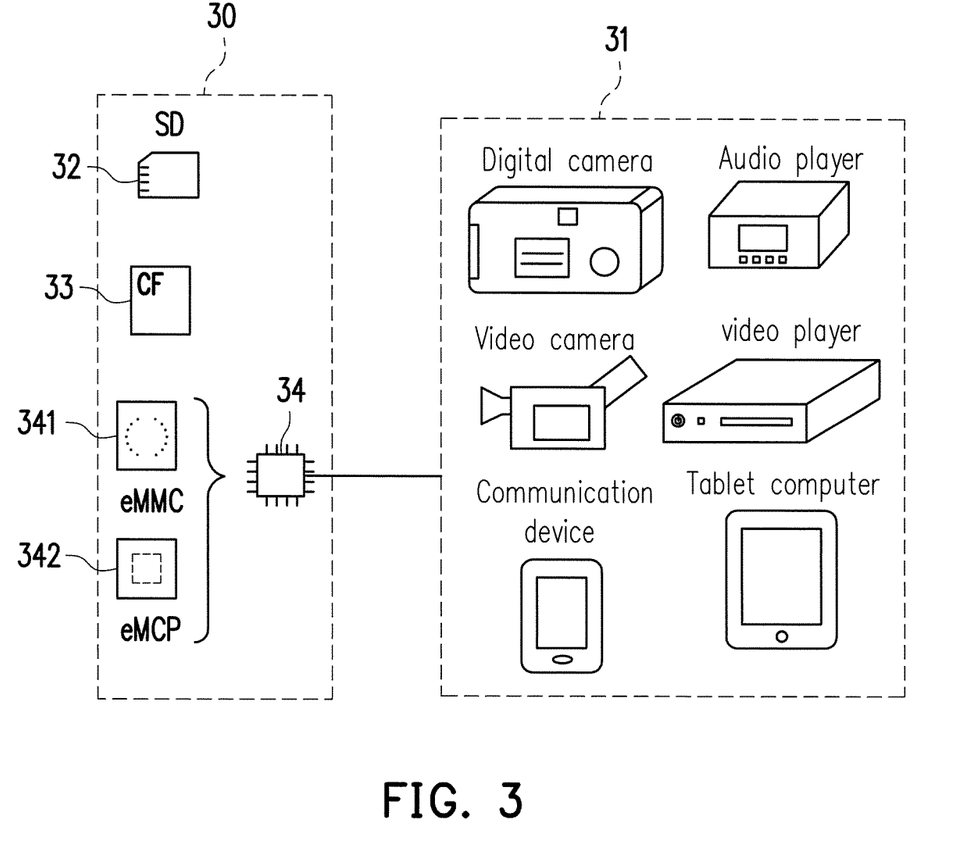
FIG. 3 is a schematic diagram illustrating a host system and a memory storage device according to another exemplary embodiment of the disclosure.

In an exemplary embodiment, the aforementioned host system may be any system capable of substantially cooperating with the memory storage device for storing data. Although the host system is illustrated as a computer system in the foregoing exemplary embodiment, however, FIG. 3 is a schematic diagram illustrating a host system and a memory storage device according to another exemplary embodiment of the disclosure. Referring to FIG. 3, in another exemplary embodiment, a host system 31 may also be a system, for example, a digital camera, a video camera, a communication device, an audio player, a video player or a tablet computer, while the memory storage device 30 may be various non-volatile memory storage devices used by the host system 31, for example, a secure digital (SD) card 32, a compact flash (CF) card 33 or an embedded storage device 34. The embedded storage device 34 includes various embedded storage devices capable of directly coupling a memory module onto a substrate of the host system 31, for example, an embedded multi media card (eMMC) 341 and/or an embedded multi chip package (eMCP) storage device 342.

Figure 4:
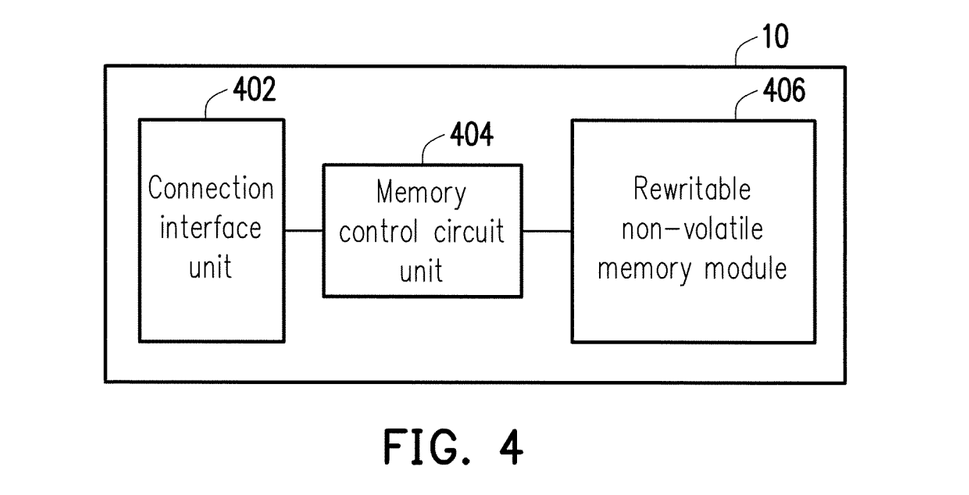
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. In the present exemplary embodiment, the connection interface unit 402 is compatible with a serial advanced technology attachment (SATA) standard. However, it should be understood that the disclosure is not limited thereto, and the connection interface unit 402 may also be compliable with a parallel advanced technology attachment (PATA) standard, an institute of electrical and electronic engineers (IEEE) 1394 standard, a peripheral component interconnect express (PCI Express) standard, a universal serial bus (USB) standard, an SD interface standard, an ultra high speed-I (UHS-I) interface standard, an ultra high speed-ii (UHS-II) interface standard, a memory stick (MS) interface standard, an MCP interface standard, an MMC interface standard, an eMMC interface standard, a universal flash storage (UFS) interface standard, an eMCP interface standard, a CF interface standard, an integrated device electronics (IDE) standard or other suitable standards. The connection interface unit 402 and the memory control circuit unit 404 may be packaged in one chip, or the connection interface unit 402 may be laid outside a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 may be a single level cell (SLC) NAND flash memory module (i.e., a flash memory module capable of storing one bit in one memory cell), a multi level cell (MLC) NAND flash memory module (i.e., a flash memory module capable of storing two bits in one memory cell), a triple level cell (TLC) NAND flash memory module (i.e., a flash memory module capable of storing three bits in one memory cell), other flash memory modules or any memory module having the same features.

In the rewritable non-volatile memory module 406, one or more bits are stored by changing a voltage (also referred to as a threshold voltage hereinafter) of each memory cell. More specifically, in each memory cell, a charge trapping layer is provided between a control gate and a channel. An amount of electrons in the charge trapping layer may be changed by applying a write voltage to the control gate, thereby changing the threshold voltage of the memory cell. This operation of changing the threshold voltage of the memory cell is also referred to as "writing data into the memory cell" or "programming the memory cell". Along with the change of the threshold voltage, each memory cell in the rewritable non-volatile memory module 406 has a plurality of storage states. The storage state in which a memory cell is may be determined by applying a read voltage, thereby obtaining one or more bits stored in the memory cell.

In the present exemplary embodiment, the memory cells of the rewritable non-volatile memory module 406 may constitute a plurality of physical programming units, and these physical programming units may constitute a plurality of physical erasing units. Specifically, the memory cells on the same word line constitute one or more of the physical programming units. If each memory cell is capable of storing two bits or more bits, the physical programming units on the same word line can be at least classified into a lower physical programming unit and an upper physical programming unit. For example, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or reliability of the lower physical programming unit is higher than reliability of the upper physical programming unit.

In the present exemplary embodiment, the physical programming unit is the smallest unit for programming. That is, the physical programming unit is the smallest unit for writing data. For example, the physical programming unit is a physical page or a physical sector. If the physical programming unit is the physical page, the physical programming units usually includes a data bit area and a redundancy bit area. The data bit area includes multiple physical sectors configured to store user data, and the redundant bit area is configured to store system data (e.g., management data such as error correcting code). In the present exemplary embodiment, the data bit area includes 32 physical sectors, and a size of each physical sector is 512 bytes (B). However, in other exemplary embodiments, the data bit area may also include 8, 16 physical sectors or physical sectors in a greater or smaller number, and the size of each physical sector may also be greater or smaller. On the other hand, the physical erasing unit is the smallest unit for erasing. Namely, each physical erasing unit contains the least number of memory cells to be erased together. For instance, the physical erasing unit is a physical block.

Figure 5:
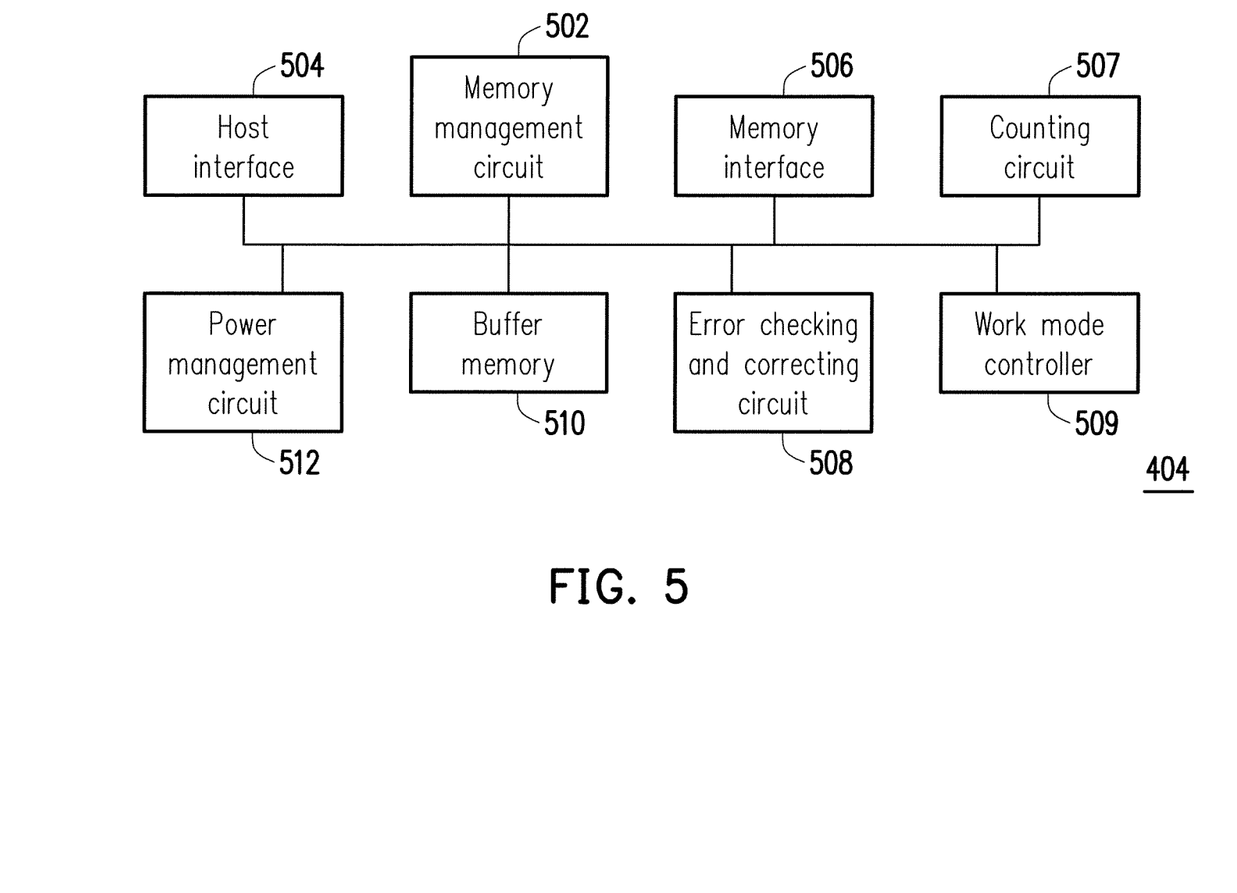
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504, a memory interface 506, a counting circuit 507, a work mode controller 509 and a buffer memory 510.

The memory management circuit 502 is configured to control overall operations of the memory control circuit unit 404. Specifically, the memory management circuit 502 has a plurality of control commands, and during operations of the memory storage device 10, the control commands are executed to perform various operations such as data writing, data reading and data erasing. The description related to the operations of the memory management circuit 502 below is equivalent to the description related to the operations of the memory control circuit unit 404.

In the present exemplary embodiment, the control commands of the memory management circuit 502 are implemented in a firmware form. For example, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory module exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, and when the memory control circuit unit 404 is enabled, the microprocessor unit first executes the boot code to load the control commands stored in the rewritable non-volatile memory module 406 to the RAM of the memory management circuit 502. Thereafter, the microprocessor unit executes the control commands to perform the operation of writing, reading or erasing data.

Further, in another exemplary embodiment, the control commands of the memory management circuit 502 may also be implemented in a hardware form. For example, the memory management circuit 502 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the memory cells of the rewritable non-volatile memory module 406 or groups of the memory cells. The memory writing circuit is configured to issue a write command sequence to the rewritable non-volatile memory module 406 to write data into the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or a plurality of program codes or command codes and is configured to instruct the rewritable non-volatile memory module 406 to perform a corresponding writing, reading or erasing operation. In an exemplary embodiment, the memory management circuit 502 may also issue other types of command sequences to the rewritable non-volatile memory module 406 for instructing to perform corresponding operations.

The host interface 504 is coupled to the memory management circuit 502 and is configured to receive and identify commands and data transmitted from the host system 11. Namely, the commands and the data from the host system 11 are transmitted to the memory management circuit 502 through the host interface 504. In the present exemplary embodiment, the host interface 504 is compliable with the SATA standard. However, it should be understood that the disclosure is not limited thereto, and the host interface 504 may also be compliable with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard or other standards suitable for data transmission.

The memory interface 506 is coupled to the memory management circuit 502 and is configured to access the rewritable non-volatile memory module 406. That is, data to be written into the rewritable non-volatile memory module 406 is converted into a form acceptable for the rewritable non-volatile memory module 406 by the memory interface 506. Specifically, if the memory management circuit 502 is to access the rewritable non-volatile memory module 406, the memory interface 506 transmits corresponding command sequences. For example, the command sequences may include a write command sequence instructing to write data, a read command sequence instructing to read data, an erase command sequence instructing to erase data and various command sequences configured to instruct corresponding memory operations (e.g., changing a reading voltage level or performing a garbage collection operation). The command sequences are, for example, generated by the memory management circuit 502 and transmitted to the rewritable non-volatile memory module 406 through the memory interface 506. The command sequences may include one or more signals or data on a bus. The signals or data may include command codes or program codes. For example, a read command sequence may include information such as an identification code for reading, a memory address and so on.

The counting circuit 507 is coupled to the memory management circuit 502. The counting circuit 507 is configured to count a receiving time interval between any two commands according to the time point of each command being received from the host system 11. For example, if a command is received at a time point T1, and another command is received at a time point T2, a receiving time interval ΔT between the two commands may be considered as T1-T2.

In the present exemplary embodiment, after receiving a plurality of commands from the host system 11, the counting circuit 507 may further count a newest idle time corresponding to the commands and a past average command-receiving-time-interval corresponding to the commands. It is noted that the newest idle time corresponding to the commands refers to a time period in idleness (i.e., an idle time) which elapses after a command is latest received. In this idle time, no more new command from the host system 11 is received. The past average command-receiving-time-interval corresponding to the commands refers to an average value, a weighted average value or a median value of a plurality of receiving time intervals with respect to a plurality of commands which are received during a past time period, and the past average command-receiving-time-interval may be any value, as long as the value is capable of reflecting the approximate average value of a plurality of receiving time intervals during the past time period.

The counting circuit 507 may include various logic circuit elements capable of providing a counting function, such as a counter, a sampling circuit, a clock circuit and/or a flip-flop, and a person ordinarily skilled in the art should know how to apply these logic circuit elements to implement the counting circuit 507, which will not be repeatedly described. In an exemplary embodiment, the counting circuit 507 may also include a processing circuit capable of performing a logic operation and/or data processing, such as a microprocessor, a microcontroller and/or an embedded controller, which is not limited in the disclosure. Additionally, in another exemplary embodiment, the counting circuit 507 may be disposed in the memory management circuit 502 or implemented as software or firmware which is executed by the memory management circuit 502, which is not limited in the disclosure.

The work mode controller 509 is coupled to the memory management circuit 502 and the counting circuit 507. The work mode controller 509 may determine whether to switch a work mode of the memory storage device 10 according to a counting result of the counting circuit 507. It is assumed that a current work mode of the memory storage device 10 is a specific work mode (also referred to as a first work mode). If it is determined to switch the work mode of the memory storage device 10 according to the counting result of the counting circuit 507, the work mode controller 509 may transmit a trigger signal (or a suspend signal) to the memory management circuit 502. The memory management circuit 502 may instruct to switch the work mode of the memory storage device 10 from the first work mode to another work mode (also referred to as a second work mode) according to the trigger signal (or the suspend signal). Nevertheless, if the work mode controller 509 does not transmit the trigger signal (or the suspend signal) to the memory management circuit 502, the memory management circuit 502 may maintain the work mode of the memory storage device 10 in the first work mode or switch the work mode of the memory storage device 10 from the current second work mode to the first work mode.

In an exemplary embodiment, the work mode controller 509 stores a first threshold value and a second threshold value. In an exemplary embodiment, the second threshold value is greater than the first threshold value. For example, a difference value between the first threshold value and the second threshold value may be a default value or may be dynamically determined. Additionally, in another exemplary embodiment, the second threshold value may also be less than or equal to the first threshold value, which is not limited in the disclosure. According to the counting result of the counting circuit 507, the work mode controller 509 determines whether a newest idle time corresponding to the received commands is greater than the first threshold value and determines whether a past average command-receiving-time-interval corresponding to the commands is greater than the second threshold value. If the newest idle time corresponding to the commands is greater than the first threshold value and the past average command-receiving-time-interval corresponding to the commands is greater than the second threshold value, the work mode controller 509 determines to switch the work mode of the memory storage device 10, for example, from the first work mode to the second work mode. Nevertheless, if the newest idle time corresponding to the commands is not greater than the first threshold value and/or the past average command-receiving-time-interval corresponding to the commands is not greater than the second threshold value, the work mode controller 509 determines to maintain the work mode of the memory storage device 10 in the first work mode.

In an exemplary embodiment, the first work mode refers to a normal work mode. In the normal work mode, the memory storage device 10 may normally perform all scheduled tasks. Each scheduled task may be a task (for example, accessing the rewritable non-volatile memory module 406 for writing or reading data) which is instructed to be operated by a command from the host system 11 or any task arranged by the memory management circuit 502 itself.

In an exemplary embodiment, a power consumption of the memory storage device 10 operated in the first work mode is higher than a power consumption of the memory storage device 10 operated in the second work mode. In an exemplary embodiment, a workload of the memory storage device 10 operated in the first work mode is higher than a workload of the memory storage device 10 operated in the second work mode. In an exemplary embodiment, a computation amount of the memory storage device 10 operated in the first work mode is higher than a computation amount of the memory storage device 10 operated in the second work mode. It is noted that the power consumptions, the workloads and the computation amounts are all evaluated based on the power consumptions, the workloads and the computation amounts within a specific unit time period.

In an exemplary embodiment, the second work mode includes a suspend mode, an idle mode or a power-saving mode. In the suspend mode (e.g., in response to the work mode of the memory storage device 10 being switched to the suspend mode), the memory management circuit 502 transmits a write command sequence instructing to store data temporarily stored in the buffer memory 510 into the rewritable non-volatile memory module 406 for long-term storage. After the data temporarily stored in the buffer memory 510 is completely copied into the rewritable non-volatile memory module 406, the memory management circuit 502 may clear the buffer memory 510 to release additional storage space in the buffer memory 510. In the idle mode (e.g., in response to the work mode of the memory storage device 10 being switched to the idle mode), the memory management circuit 502 may further enter an idle state and/or perform some predetermined tasks. In the power-saving mode (e.g., in response to the work mode of the memory storage device 10 being switched to the power-saving mode), the memory management circuit 502 may enter a power-saving state to lower down a part of system performance (for example, to reduce a work voltage and/or a work frequency of the memory storage device 10). In an exemplary embodiment, the second work mode may also include at least a part of characteristics of the suspend mode, the idle mode and the power-saving mode, which depends on actual demands. Additionally, in an exemplary embodiment, the first work mode refers to (all) work modes other than the second work mode, as long as the power consumption of the memory storage device 10 operated in the first work mode is higher than the power consumption of the memory storage device 10 operated in the second work mode.

In an exemplary embodiment, if the current work mode of the memory storage device 10 is the second work mode, the work mode controller 509, when receiving a newest command from the host system 11, may instruct to switch the work mode of the memory storage device 10 back to the first work mode. In the first work mode, the memory management circuit 502 may execute an operation, such as data reading, data writing or data deleting (or erasing) instructed by the newest command.

In an exemplary embodiment, the work mode controller 509 may include a control circuit capable of performing a logic operation and/or data processing, such as a microprocessor, a microcontroller and/or an embedded controller, which is not limited in the disclosure. Additionally, in an exemplary embodiment, the work mode controller 509 may be disposed in the memory management circuit 502 or implemented as software or firmware executed by the memory management circuit 502, which is not limited in the disclosure.

The buffer memory 510 is coupled to the memory management circuit 502 and is configured to temporarily store data and commands from the host system 11 or data from the rewritable non-volatile memory module 406.

In an exemplary embodiment, the memory control circuit unit 404 may also include an error checking and correcting circuit 508 and a power management circuit 512.

The error checking and correcting circuit 508 is coupled to the memory management circuit 502 and is configured to perform an error checking and correcting operation to ensure data accuracy. Specifically, when the memory management circuit 502 receives a write command from the host system 11, the error checking and correcting circuit 508 generates an error correcting code (ECC) and/or an error detecting code (EDC) for data corresponding to the write command, and the memory management circuit 502 writes the data corresponding to the write command and the corresponding ECC and/or EDC into the rewritable non-volatile memory module 406. Afterwards, the memory management circuit 502 reads the ECC and/or EDC corresponding to the data while reading the data from the rewritable non-volatile memory module 406, and the error checking and correcting circuit 508 performs the error checking and correcting operation on the data read according to the ECC and/or EDC.

The power management circuit 512 is coupled to the memory management circuit 502 and is configured to control the power of the memory storage device 10.

Figure 6:
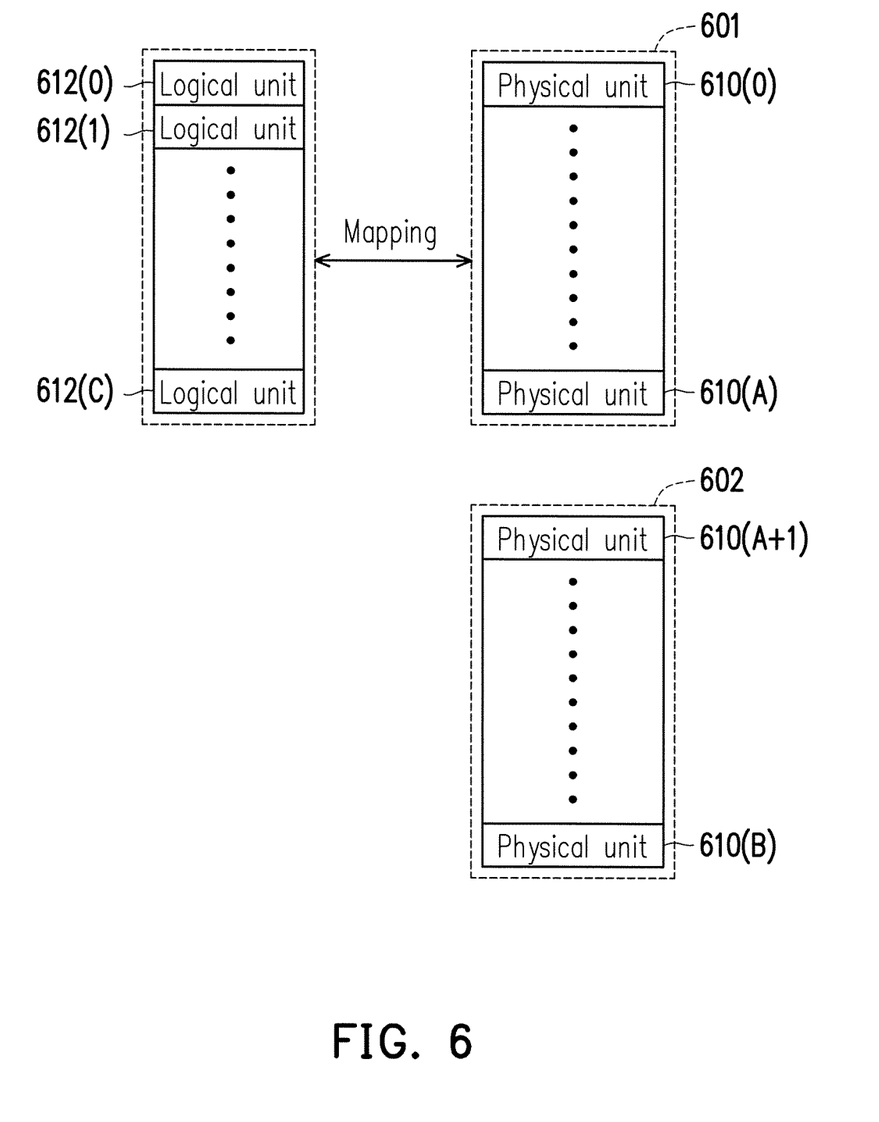
FIG. 6 is a schematic diagram illustrating the management of the rewritable non-volatile memory module according to an exemplary embodiment of the disclosure.

FIG. 6 is a schematic diagram illustrating the management of the rewritable non-volatile memory module according to an exemplary embodiment of the disclosure.

Referring to FIG. 6, the memory management circuit 502 logically groups physical units 610(0)-610(B) of the rewritable non-volatile memory module 406 into a storage area 601 and a replacement area 602. The physical units 610(0)-610(A) in the storage area 601 are configured to store data, and the physical units 610(A+1)-610(B) in the replacement area 602 are configured to substitute for damaged physical units in the storage area 601. For example, if data read from a specific physical unit fails to be corrected due to containing too many errors, the physical unit is considered as a damaged physical unit. It is noted that if there are no available physical units in the replacement area 602, the memory management circuit 502 may announce the entire memory storage device 10 to be in a write protect state, and no more data can be written into the memory storage device 10.

In the present exemplary embodiment, each physical unit refers to a physical erasing unit. Nevertheless, in another exemplary embodiment, a physical unit may also refer to a physical address, a physical programming unit or a composition of a plurality of continuous or discontinuous physical addresses. The memory management circuit 502 arranges logical units 612(0)-612(C) for mapping the physical units 610(0)-610(A) in the storage area 601. In the present exemplary embodiment, each logical unit refers to a logical address. Nevertheless, in another exemplary embodiment, a logical unit may also refer to a logical programming unit, a logical erasing unit or a composition of a plurality of continuous or discontinuous logical addresses. Further, each of the logical units 612(0)-612(C) may be mapped to one or a plurality of physical units.

The memory management circuit 502 records a mapping relationship between the logical units and the physical units (which is also referred to as a logical-physical address mapping relationship) in at least one logical-physical address mapping table. When the host system 11 is about to read data from the memory storage device 10 or write data into the memory storage device 10, the memory management circuit 502 may perform a data accessing operation on the memory storage device 10 according to the logical-physical address mapping table.

It is noted that in the following description, some terms may be replaced with corresponding abbreviations for ease of reading (see Table 1).

TABLE 1

| rewritable non-volatile memory module | RNVM module |
|---|---|
| physical programming unit | PPU |
| memory management circuit | MMC |
| read voltage level | RVL |
| work mode controller | WMC |
| newest idle time | NIT |
| receiving time interval | RTI |
| command-receiving-time-interval | CRTI |

Figure 7:
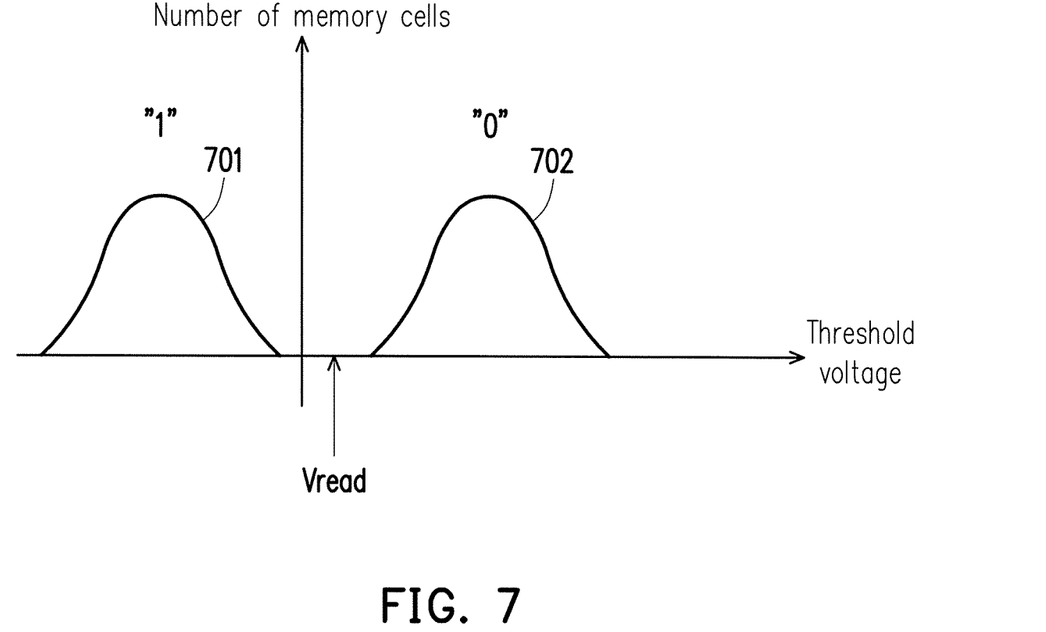
FIG. 7 is a schematic diagram illustrating a threshold voltage distribution of memory cells according to an exemplary embodiment of the disclosure.

FIG. 7 is a schematic diagram illustrating a threshold voltage distribution of memory cells according to an exemplary embodiment of the disclosure.

Referring to FIG. 7, when receiving a write command from the host system 11, the MMC 502 transmits a write command sequence to instruct the RNVM module 406 to program the corresponding memory cells for storing data according to the data and a writing address (e.g., a logical unit) indicated in the write command. Taking a SLC NAND flash memory as an example, a threshold voltage distribution of the programmed memory cells may include states 701 and 702. The state 701 corresponds to the number of memory cells storing a first bit value, and the state 702 corresponds to the number of memory cells storing a second bit value. In the present exemplary embodiment, the first bit value is 1, and the second bit value is 0. Alternatively, in another exemplary embodiment, the first bit value is 0, and the second bit value is 1.

When receiving a read command from the host system 11, the MMC 502 transmits a read command sequence to instruct the RNVM module 406 to read data from the memory cells. For example, according to the received read command sequence, the RNVM module 406 may read the data from the memory cells by using a RVL Vread. For example, after the RVL Vread is applied to the corresponding memory cells, the MMC 502 reads bit data of the first bit value (e.g., 1) if a threshold voltage of a specific memory cell is smaller than the RVL Vread, or alternatively, the MMC 502 reads bit data of the second bit value (e.g., 0) if a threshold voltage of a specific memory cell is greater than RVL Vread.

It is noted that as a total number of the bits stored by each memory cell varies, a total number of states contained in the threshold voltage distribution of the memory cells may also vary. For example, in the exemplary embodiment illustrated in FIG. 7, each memory cell stores one bit, and thus, the threshold voltage distribution of the memory cells includes two states. Nevertheless, in other exemplary embodiments, if a memory cell is capable of storing two bits (e.g., a MLC NAND flash memory), the threshold voltage distribution of the memory cells in the RNVM module 406 may include four states. Alternatively, if a memory cell is capable of storing three bits (e.g., a TLC NAND flash memory), the threshold voltage distribution of the memory cells in the RNVM module 406 may include eight states.

Figure 8:
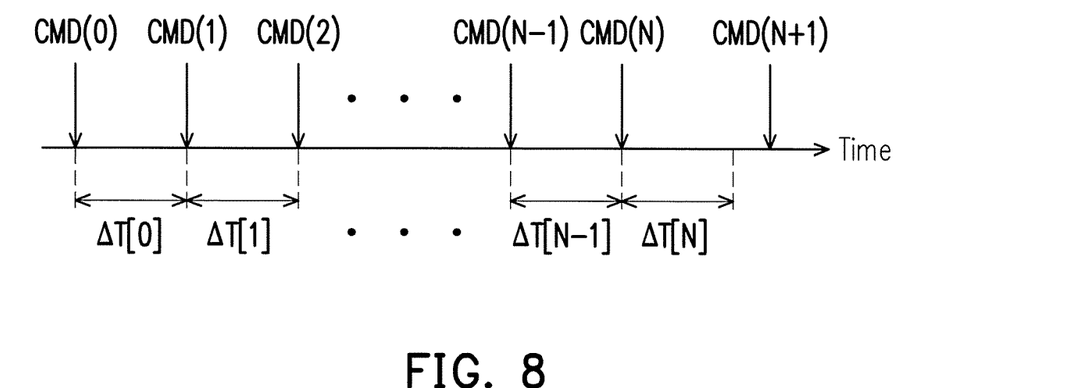
FIG. 8 is a schematic diagram illustrating a newest idle time and receiving time intervals corresponding to a plurality of commands according to an exemplary embodiment of the disclosure.

FIG. 8 is a schematic diagram illustrating a NIT and RTIs corresponding to a plurality of commands according to an exemplary embodiment of the disclosure.

Referring to FIG. 8, it is assumed that the MMC 502 sequentially receives commands CMD(0) to CMD(N) from the host system 11, where N is an integer, and the command CMD(N) is the newest received command. A RTI ΔT[0] is between a time point of receiving the command CMD(0) and a time point of receiving the command CMD(1), a RTI ΔT[1] is between a time point of receiving the command CMD(1) and a time point of receiving the command CMD (2), and as so derived, a RTI ΔT[N−1] is between a time point of receiving the command CMD(N−1) and a time point of receiving the command CMD(N). The RTIs ΔT[0] to ΔT[N−1] may be different from one another or at least partially the same.

In an exemplary embodiment, each of the RTIs ΔT[0]-ΔT[N−1] is also referred to as a past CRTI, and ΔT[N] represents a NIT. During each of the RTIs ΔT[0] to ΔT[N−1], no command from the host system 11 is received. In addition, the NIT ΔT[N] is an idle time after the last command CMD(N) is received and before a next command CMD(N+1) is received.

The counting circuit 507 may count the RTIs ΔT[0] to ΔT[N−1] according to the time points of receiving the commands CMD(0) to CMD(N) and count the NIT ΔT[N]. In an exemplary embodiment, the counting circuit 507 may calculate a weighted average of the RTIs ΔT[0] to ΔT[N−1] to obtain a past average CRTI corresponding to the commands CMD(0) to CMD(N).

In an exemplary embodiment, the counting circuit 507 may configure (or set) a weight value for each of the RTIs ΔT[0] to ΔT[N−1]. For example, the counting circuit 507 may configure a weight value V[k] for the RTI ΔT[k], where k is an integer between 0 and N−1. For example, a weight value V[0] corresponds to the RTI ΔT[0], a weight value V[1] corresponds to the RTI ΔT[1], and as so derived, a weight value V[N−1] corresponds to the RTI ΔT[N−1]. The weight values V[0] to V[N−1] may be different from one another or at least partially the same.

The counting circuit 507 may calculate the weighted average of the RTIs ΔT[0] to ΔT[N−1] according to the RTIs ΔT[0] to ΔT[N−1] and the corresponding weight values V[0] to V[N−1]. For example, the counting circuit 507 may calculate the weighted average of the RTIs ΔT[0] to ΔT[N−1] according to Formula (1.1) below.

$$REF = \frac{\sum_{k=0}^{N-1}(V[k] \times \Delta T[k])}{\sum_{K=0}^{N-1}V[k]} \quad (1.1)$$

In Formula (1.1), REF represents the past average CRTI corresponding to the commands CMD(0) to CMD(N). Taking FIG. 8 for example, it is assumed that 30 commands are received (i.e., N=29), and past average CRTIs corresponding to the 30 commands may be calculated according to Formula (1.1). It is noted that in an exemplary embodiment, the calculation of the past average CRTI corresponding to the commands CMD(0) to CMD(N) is not relevant to the NIT ΔT[N], as shown in Formula (1.1).

In an exemplary embodiment, Formula (1.1) may also be adjusted, for example, by adding other variables or adjusting at least a part of the logic operation elements to meet actual demands, as long as the formula can be used to calculate a value capable of (approximately) reflecting the average of RTIs corresponding to a plurality of commands which are received during a past time period. Additionally, in another exemplary embodiment, the counting circuit 507 may also input the RTIs ΔT[0] to ΔT[N−1] and the corresponding weight values V[0] to V[N−1] into a look-up table and employ an output from the look-up table as the past average CRTI corresponding to the commands CMD(0) to CMD(N).

In an exemplary embodiment of FIG. 8, the commands CMD(0) to CMD(N) are sequentially received. Namely, the command CMD(0) is first received, then the command CMD(1) is received, the command CMD(2) is received, and as so derived, the command CMD(N) is last received. In an exemplary embodiment, the weight values V[0] to V[N−1] may be determined according to a receiving sequence of the commands CMD(0) to CMD(N).

In an exemplary embodiment, in response to a receiving time point of a specific command (also referred to as a first command) being earlier than a receiving time point of another command (also referred to as a second command), the counting circuit 507 may determine a weight value (also referred to as a first weight value) corresponding to the first command as a specific value (also referred to as a first value) and determine a weight value (also referred to as a second weight value) corresponding to the second command as another value (also referred to as second value) which is greater than the first value. In other words, if the receiving time point of the command CMD(k) is much earlier, the weight value V[k] corresponding to the RTI ΔT[k] may be determined as a much smaller value. Alternatively, if the receiving time point of the command CMD(k) is later, the weight value V[k] corresponding to the RTI ΔT[k] becomes greater. Taking the embodiment illustrated in FIG. 8 as an example, the command CMD(2) is received later than the command CMD(0), such that the determined weight value V[1] is greater than the determined weight value V[0]. Likewise, the command CMD(N) is received later than the command CMD(2), such that the determined weight value V[N−1] is greater than the determined weight value V[1]. According to another perspective, in an exemplary embodiment, the weight value V[k] may be determined according to a sorting position where the corresponding command CMD [k] is located in the entire command queue of the CMD(0) to CMD(N).

In the exemplary illustrated in FIG. 8, if the WMC 509 determines that the NIT ΔT[N] is greater than the first threshold value, and the past average CRTI (e.g., REF in Formula (1.1)) corresponding to the commands CMD(0) to CMD(N) is greater than the second threshold value, the WMC 509 may instruct the MMC 502 to switch the work mode of the memory storage device 10 from the first work mode to the second work mode. Nevertheless, if the NIT ΔT[N] is not greater than the first threshold value and/or the past average CRTI corresponding to the commands CMD(0) to CMD(N) is not greater than the second threshold value, the WMC 509 may instruct the MMC 502 to maintain the work mode of the memory storage device 10 in the first work mode. In other words, if the NIT ΔT[N] is not greater than the first threshold value and/or the past average CRTI corresponding to the commands CMD(0) to CMD(N) is not greater than the second threshold value, the WMC 509 may not instruct to switch the work mode of the memory storage device 10 from the first work mode to the second work mode.

It is noted that the NIT ΔT[N] in the exemplary embodiment illustrated in FIG. 8 starts to be counted from a time point of receiving the newest command CMD(N) until the next command CMD(N+1) is received from the host system 11. In other words, before the command CMD(N+1) is received, if the NIT ΔT[N] is greater than the first threshold value and the past average CRTI corresponding to the commands CMD(0) to CMD(N) is greater than the second threshold value, the WMC 509 may instruct to switch the work mode of the memory storage device 10 from the first work mode to the second work mode. If the nest command CMD(N+1) is received before the NIT ΔT[N] is greater than the first threshold value, the WMC 509 determines that the NIT ΔT[N] is not greater than the first threshold value.

In the exemplary embodiment illustrated in FIG. 8, after the work mode of the memory storage device 10 is switched to the second work mode, if the next command CMD(N+1) is received, the WMC 509 may instruct to switch the work mode of the memory storage device 10 from the second work mode back to the first work mode for performing a task instructed by the command CMD(N+1).

Figure 9:
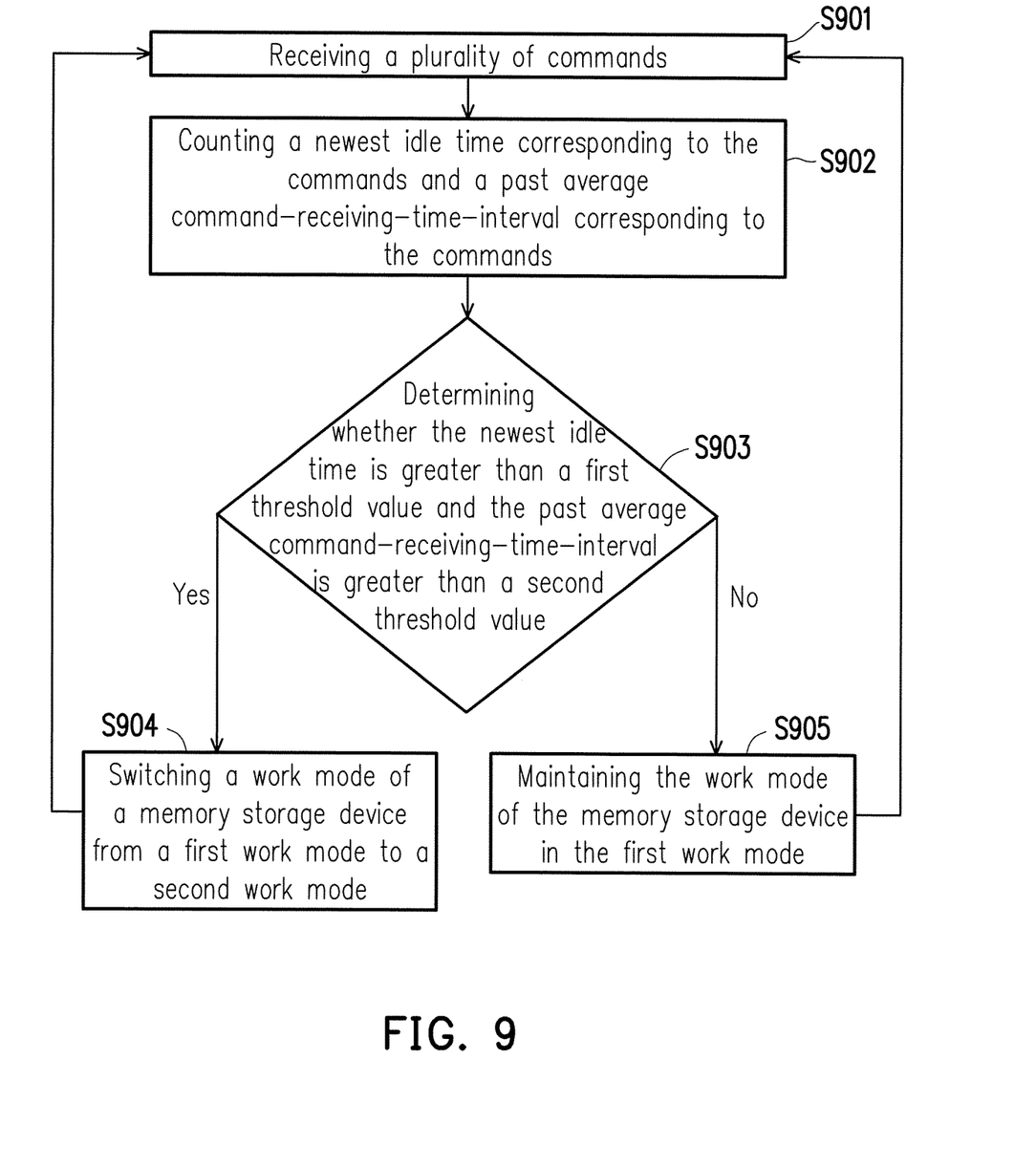
FIG. 9 is a flowchart illustrating a memory management method according to an exemplary embodiment of the disclosure.

FIG. 9 is a flowchart illustrating a memory management method according to an exemplary embodiment of the disclosure.

Referring to FIG. 9, in step S901, a plurality of commands are received from a host system. In step S902, a NIT corresponding to the commands and a past average CRTI corresponding to the commands are counted. In step S903, whether the NIT corresponding to the commands is greater than the first threshold value and the past average CRTI corresponding to the commands is greater than the second threshold value is determined. If the NIT corresponding to the commands is greater than the first threshold value and the past average CRTI corresponding to the commands is greater than the second threshold value, in step S904, a work mode of a memory storage device is switched from a first work mode to a second work mode. If the NIT corresponding to the commands is not greater than the first threshold value and/or the past average CRTI corresponding to the commands is not greater than the second threshold value, in step S905, the work mode of the memory storage device is maintained in the first work mode.

Nevertheless, each step illustrated in FIG. 9 has been described in detail above and will not be repeated. It is noted that the steps in FIG. 9 may be implemented as a plurality of program codes or circuits, which are not limited in the disclosure. In addition, the method illustrated in FIG. 9 may be used together with the embodiments set forth above or may be used solely, which is not limited in the disclosure.

In light of the foregoing, the disclosure can not only determine whether to switch the work mode of the memory storage device based on whether the NIT before the next command is received is greater than the first threshold value, but also determine whether to switch the work mode further based on whether the past average CRTI is greater than the second threshold value, thereby achieving double confirmation of the switching of the work mode. In this way, the timing for switching the work mode can be determined more accurately, the frequency of switching the work mode can be reduced, and the lifespan of the RNVM module can be extended.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method, for a memory storage device comprising a counting circuit, a work mode controller and a rewritable non-volatile memory module, and the memory management method comprising:

receiving a plurality of commands from a host system;

counting a newest idle time corresponding to the commands and a past average command-receiving-time-interval corresponding to the commands by the counting circuit;

dynamically changing a work mode of the memory storage device from a first work mode to a second work mode by the work mode controller if the newest idle time is greater than a first threshold value and the past average command-receiving-time-interval is greater than a second threshold value; and maintaining the work mode of the memory storage device in the first work mode if the newest idle time is not greater than the first threshold value or the past average command-receiving-time-interval is not greater than the second threshold value, wherein a power consumption of the memory storage device operated in the first work mode is higher than a power consumption of the memory storage device operated in the second work mode.

2. The memory management method according to claim 1, wherein the step of counting the past average command-receiving-time-interval corresponding to the commands by the counting circuit comprises:

counting a first past command-receiving-time-interval and a second past command-receiving-time-interval; and obtaining a weighted average of the first past command-receiving-time-interval and the second past command-receiving-time-interval to obtain the past average command-receiving-time-interval.

3. The memory management method according to claim 2, wherein the step of obtaining the weighted average of the first past command-receiving-time-interval and the second past command-receiving-time-interval comprises:

determining a first weight value corresponding to the first past command-receiving-time-interval and a second weight value corresponding to the second past command-receiving-time-interval; and obtaining the weighted average according to the first weight value, the second weight value, the first past command-receiving-time-interval and the second past command-receiving-time-interval.

4. The memory management method according to claim 3, wherein the first past command-receiving-time-interval is a receiving time interval between a first command and a former command of the first command among the commands, the second past command-receiving-time-interval is a receiving time interval between a second command and a former command of the second command among the commands, and the step of determining the first weight value corresponding to the first past command-receiving-time-interval and the second weight value corresponding to the second past command-receiving-time-interval comprises:

determining the first weight value and the second weight value according to a receiving sequence of the first command and the second command.

5. The memory management method according to claim 4, wherein the step of determining the first weight value and the second weight value according to the receiving sequence of the first command and the second command comprises:

determining the first weight value as a first value and determining the second weight value as a second value greater than the first value in response to a receiving time point of the first command being earlier than a receiving time point of the second command.

6. The memory management method according to claim 3, wherein the step of obtaining the weighted average according to the first weight value, the second weight value, the first past command-receiving-time-interval and the second past command-receiving-time-interval comprises:

obtaining the weighted average according to a formula of:

$$REF = \frac{\sum_{k=0}^{N-1}(V[k] \times \Delta T[k])}{\sum_{K=0}^{N-1} V[k]},$$

wherein REF represents the past average command-receiving-time-interval, V[k] represents a kth weight value, ΔT[k] represents a kth past command-receiving-time-interval, and k and N are both positive integers.

7. The memory management method according to claim 1, wherein the second work mode comprises a suspend mode, and the memory management method further comprises:

transmitting a write command sequence instructing to store data temporarily stored in a buffer memory into the rewritable non-volatile memory module in response to the work mode of the memory storage device being switched to the suspend mode; and clearing the buffer memory.

8. A memory storage device, comprising:

a connection interface unit, configured to be coupled to a host system;

a rewritable non-volatile memory module; and a memory control circuit unit, coupled to the connection interface unit and the rewritable non-volatile memory module, wherein the memory control circuit unit is configured to receive a plurality of commands from the host system, wherein the memory control circuit unit is further configured to count a newest idle time corresponding to the commands and a past average command-receiving-time-interval corresponding to the commands, wherein the memory control circuit unit is further configured to dynamically switch a work mode of the memory storage device from a first work mode to a second work mode if the newest idle time is greater than a first threshold value and the past average command-receiving-time-interval is greater than a second threshold value, wherein the memory control circuit unit is further configured to maintain the work mode of the memory storage device in the first work mode if the newest idle time is not greater than the first threshold value or the past average command-receiving-time-interval is not greater than the second threshold value, wherein a power consumption of the memory storage device operated in the first work mode is higher than a power consumption of the memory storage device operated in the second work mode.

9. The memory storage device according to claim 8, wherein the operation of counting the past average command-receiving-time-interval corresponding to the commands by the memory control circuit unit comprises:

counting a first past command-receiving-time-interval and a second past command-receiving-time-interval; and obtaining a weighted average of the first past command-receiving-time-interval and the second past command-receiving-time-interval to obtain the past average command-receiving-time-interval.

10. The memory storage device according to claim 9, wherein the operation of obtaining the weighted average of the first past command-receiving-time-interval and the second past command-receiving-time-interval by the memory control circuit unit comprises:

determining a first weight value corresponding to the first past command-receiving-time-interval and a second weight value corresponding to the second past command-receiving-time-interval; and obtaining the weighted average according to the first weight value, the second weight value, the first past command-receiving-time-interval and the second past command-receiving-time-interval.

11. The memory storage device according to claim 10, wherein the first past command-receiving-time-interval is a receiving time interval between a first command and a former command of the first command among the commands, the second past command-receiving-time-interval is a receiving time interval between a second command and a former command of the second command among the commands, and the operation of determining the first weight value corresponding to the first past command-receiving-time-interval and the second weight value corresponding to the second past command-receiving-time-interval by the memory control circuit unit comprises:

determining the first weight value and the second weight value according to a receiving sequence of the first command and the second command.

12. The memory storage device according to claim 11, wherein the operation of determining the first weight value and the second weight value according to the receiving sequence of the first command and the second command by the memory control circuit unit comprises:

determining the first weight value as a first value and determining the second weight value as a second value greater than the first value in response to a receiving time point of the first command being earlier than a receiving time point of the second command.

13. The memory storage device according to claim 10, wherein the operation of obtaining the weighted average according to the first weight value, the second weight value, the first past command-receiving-time-interval and the second past command-receiving-time-interval by the memory control circuit unit comprises:
obtaining the weighted average according to a formula of:

$$REF = \frac{\sum_{k=0}^{N-1}(V[k] \times \Delta T[k])}{\sum_{K=0}^{N-1} V[k]},$$

wherein REF represents the past average command-receiving-time-interval, V[k] represents a kth weight value, ΔT[k] represents a kth past command-receiving-time-interval, and k and N are both positive integers.

14. The memory storage device according to claim 8, wherein the second work mode comprises a suspend mode, and the memory control circuit unit is further configured to transmit a write command sequence instructing to store data temporarily stored in a buffer memory into the rewritable non-volatile memory module in response to the work mode of the memory storage device being switched to the suspend mode,
wherein the memory control circuit unit is further configured to clear the buffer memory.

15. A memory control circuit unit, for controlling a memory storage device comprising a rewritable non-volatile memory module, and the memory control circuit unit comprising:
a host interface, configured to be coupled to a host system;
a memory interface, configured to be coupled to the rewritable non-volatile memory module;
a counting circuit;
a work mode controller; and
a memory management circuit, coupled to the host interface, the memory interface, the counting circuit and the work mode controller,
wherein the memory management circuit is configured to receive a plurality of commands from the host system,
wherein the counting circuit is configured to count a newest idle time corresponding to the commands and a past average command-receiving-time-interval corresponding to the commands,
wherein the work mode controller is configured to dynamically switch a work mode of the memory storage device from a first work mode to a second work mode if the newest idle time is greater than a first threshold value and the past average command-receiving-time-interval is greater than a second threshold value,
wherein the work mode controller is further configured to maintain the work mode of the memory storage device in the first work mode if the newest idle time is not greater than the first threshold value or the past average command-receiving-time-interval is not greater than the second threshold value,
wherein a power consumption of the memory storage device operated in the first work mode is higher than a power consumption of the memory storage device operated in the second work mode.

16. The memory control circuit unit according to claim 15, wherein the operation of counting the past average command-receiving-time-interval corresponding to the commands by the counting circuit comprises:
counting a first past command-receiving-time-interval and a second past command-receiving-time-interval; and
obtaining a weighted average of the first past command-receiving-time-interval and the second past command-receiving-time-interval to obtain the past average command-receiving-time-interval.

17. The memory control circuit unit according to claim 16, wherein the operation of obtaining the weighted average of the first past command-receiving-time-interval and the second past command-receiving-time-interval by the counting circuit comprises:
determining a first weight value corresponding to the first past command-receiving-time-interval and a second weight value corresponding to the second past command-receiving-time-interval; and
obtaining the weighted average according to the first weight value, the second weight value, the first past command-receiving-time-interval and the second past command-receiving-time-interval.

18. The memory control circuit unit according to claim 17, wherein the first past command-receiving-time-interval is a receiving time interval between a first command and a former command of the first command among the commands, the second past command-receiving-time-interval is a receiving time interval between a second command and a former command of the second command among the commands, and the operation of determining the first weight value corresponding to the first past command-receiving-time-interval and the second weight value corresponding to the second past command-receiving-time-interval by the counting circuit comprises:
determining the first weight value and the second weight value according to a receiving sequence of the first command and the second command.

19. The memory control circuit unit according to claim 18, wherein the operation of determining the first weight value and the second weight value according to the receiving sequence of the first command and the second command by the counting circuit comprises:
determining the first weight value as a first value and determining the second weight value as a second value greater than the first value in response to a receiving time point of the first command being earlier than a receiving time point of the second command.

20. The memory control circuit unit according to claim 17, wherein the operation of obtaining the weighted average according to the first weight value, the second weight value, the first past command-receiving-time-interval and the second past command-receiving-time-interval by the counting circuit comprises:
obtaining the weighted average according to a formula of:

$$REF = \frac{\sum_{k=0}^{N-1}(V[k] \times \Delta T[k])}{\sum_{K=0}^{N-1} V[k]},$$

wherein REF represents the past average command-receiving-time-interval, V[k] represents a kth weight value, ΔT[k] represents a kth past command-receiving-time-interval, and k and N are both positive integers.

21. The memory control circuit unit according to claim 15, wherein the second work mode comprises a suspend mode, and the memory management circuit is further configured to transmit a write command sequence instructing to store data temporarily stored in a buffer memory into the rewritable non-volatile memory module in response to the work mode of the memory storage device being switched to the suspend mode, wherein the memory management circuit is further configured to clear the buffer memory.

* * * * *